(12) United States Patent
Malik et al.

(10) Patent No.: US 6,928,735 B2
(45) Date of Patent: Aug. 16, 2005

(54) METHOD OF VEHICLE DOOR ASSEMBLY

(75) Inventors: David J. Malik, Warren, MI (US); Hamid G. Kia, Bloomfield Hills, MI (US); Lei Zhang, Shanghai (CN); Li Yu, Shanghai (CN); Dexin Wang, Toronto (CA); Xie Cheng, Shanghai (CN); Shengxiang Zuo, Shanghai (CN); Yongcheng Li, Shanghai (CN)

(73) Assignee: General Motors Corporation, Detroit, MI (US)

( * ) Notice: Subject to any disclaimer, the term of this patent is extended or adjusted under 35 U.S.C. 154(b) by 184 days.

(21) Appl. No.: 10/206,805

(22) Filed: Jul. 26, 2002

(65) Prior Publication Data

US 2004/0016101 A1 Jan. 29, 2004

(51) Int. Cl.[7] .................................................. B60J 5/04
(52) U.S. Cl. ....................... 29/897.2; 29/458; 29/527.2; 156/292; 49/502; 49/506; 296/146.1; 296/146.5; 296/146.7
(58) Field of Search ............................... 29/897.2, 460, 29/463, 527.2, 783, 791, 281.1, 958; 156/292; 49/502, 506; 296/146.1, 145.5, 146.7; 428/297.4, 299.7, 360.1, 360.7, 361.4

(56) References Cited

U.S. PATENT DOCUMENTS

| | | | | |
|---|---|---|---|---|
| 4,328,642 A | * | 5/1982 | Presto | .......................... 49/502 |
| 4,648,208 A | * | 3/1987 | Baldamus et al. | ............ 49/502 |
| 4,800,638 A | * | 1/1989 | Herringshaw et al. | ..... 29/407.1 |
| 4,845,894 A | * | 7/1989 | Herringshaw et al. | ........ 49/502 |
| 5,121,534 A | * | 6/1992 | Kruzich | ................... 29/407.01 |
| 5,288,356 A | * | 2/1994 | Benefiel | ...................... 156/196 |
| 5,749,992 A | * | 5/1998 | Eklund et al. | .............. 156/212 |
| 5,787,646 A | * | 8/1998 | Nakamori | ..................... 49/502 |
| 5,857,732 A | * | 1/1999 | Ritchie | ..................... 296/146.5 |
| 6,139,088 A | * | 10/2000 | Okamoto et al. | ........ 296/146.6 |
| 6,176,542 B1 | * | 1/2001 | Gooding et al. | ......... 296/146.6 |
| 6,231,112 B1 | * | 5/2001 | Fukumoto et al. | ....... 296/146.5 |
| 6,660,373 B2 | * | 12/2003 | Hsu et al. | ................ 428/297.4 |

FOREIGN PATENT DOCUMENTS

WO   WO 94/21740   * 9/1994

* cited by examiner

*Primary Examiner*—Jermie E. Cozart
(74) *Attorney, Agent, or Firm*—Kathryn A. Marra

(57) ABSTRACT

A plurality of interior door components such as a window lift mechanism, a lock assembly, and a horizontal energy absorbing member are coupled to a door substructure. A finished exterior door panel having a class-A surface is adhesively bonded to the substructure, disposing the door interior components between the finished exterior door panel and a portion of the door substructure. The assembled door is coupled to a previously painted vehicle body.

10 Claims, 4 Drawing Sheets

METHOD OF VEHICLE DOOR ASSEMBLY

FIELD OF THE INVENTION

The present invention of relates to a vehicle door and more particularly to a method of manufacturing a vehicle door which reduces assembly time and complexity.

BACKGROUND OF THE INVENTION

Traditionally, vehicle-manufacturing techniques have required that a vehicle door must be assembled before a vehicle has been painted. In this regard, a door substructure with depending door exterior is coupled to a vehicle via a pair of hinges. While the body of a vehicle is being coated with various layers, the door is also coated. During the painting operation, the door must be opened and closed by rotation about the coupling hinge to insure proper painting of the door and vehicle body. Those skilled in the art will recognize these operations significantly increase the complexity of robotic painting systems and their associated paint paths and therefore increase manufacturing time and costs.

After the door and body have been painted, mechanisms related to the functioning of an assembled door must be coupled to the door substructure and exterior surface. Traditionally the painted door is rotated about its hinges and interior door components are inserted into the door substructure through access holes within the door substructure. The time needed for incorporation of the internal door components, such as window lift mechanisms, lock mechanisms and restraint mechanisms, significantly increases manufacturing time and therefore costs. After incorporation of the internal door components, the vehicles interior trim components are then coupled to the door substructure's interior surface to cover the door substructure. At this point, the assembled door's alignment must be adjusted to insure proper fit and finish to the assembled vehicle body.

What is needed then is a door assembly and associated method for producing a vehicle door which does not suffer from the above-mentioned disadvantages. This in turn, will provide a door assembly which is inexpensive and easily manufactured and increases the overall flexibility for a vehicle's design and component incorporation. It is, therefore, an object of the present invention to provide such a vehicle door and associated method for producing a vehicle door.

SUMMARY OF THE INVENTION

In accordance with the teachings of the present invention, a method of manufacturing a vehicle door is disclosed. The method includes providing a door substructure with a finished exterior door panel. At least one interior door component is coupled to the door substructure. After the interior door components have been coupled to the door substructure, the finished exterior door panel is coupled to the door substructure disposing the interior components between finished exterior door panel and the door substructure.

In other embodiment of the present invention, a method of manufacturing a door is disclosed. A plurality of interior door components are coupled to a door substructure. A finished exterior door panel having a class-A surface is adhesively bonded to the substructure, disposing the interior door components between the finished exterior door panel and the door substructure.

In another embodiment of the present invention, a method for manufacturing a vehicle is disclosed. An assembled door is first produced by coupling at least one interior door component to a vehicle door substructure. A finished exterior door panel having a class-A finish is coupled to the door substructure. The assembled door is then coupled to the finished vehicle.

BRIEF DESCRIPTION OF THE DRAWINGS

Still other advantages of the present invention will become apparent to those skilled in the art after reading the following specification and by reference to the drawings in which.

DETAILED DESCRIPTION OF THE PREFERRED EMBODIMENTS

Figure 1:
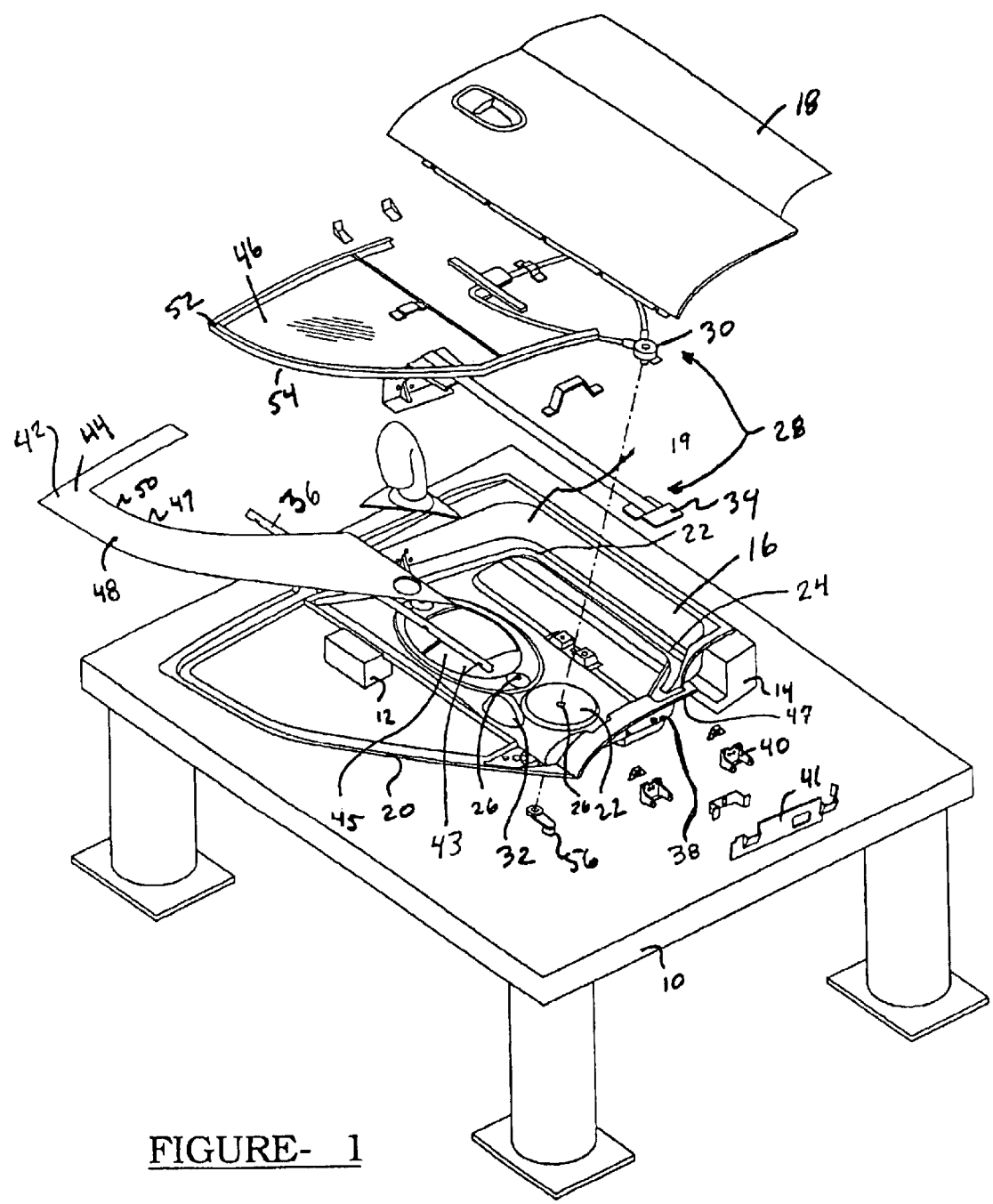
FIGS. 1 and 2 represent exploded views showing the door assembly process for producing doors according to the teachings of the present invention.
Figure 2:
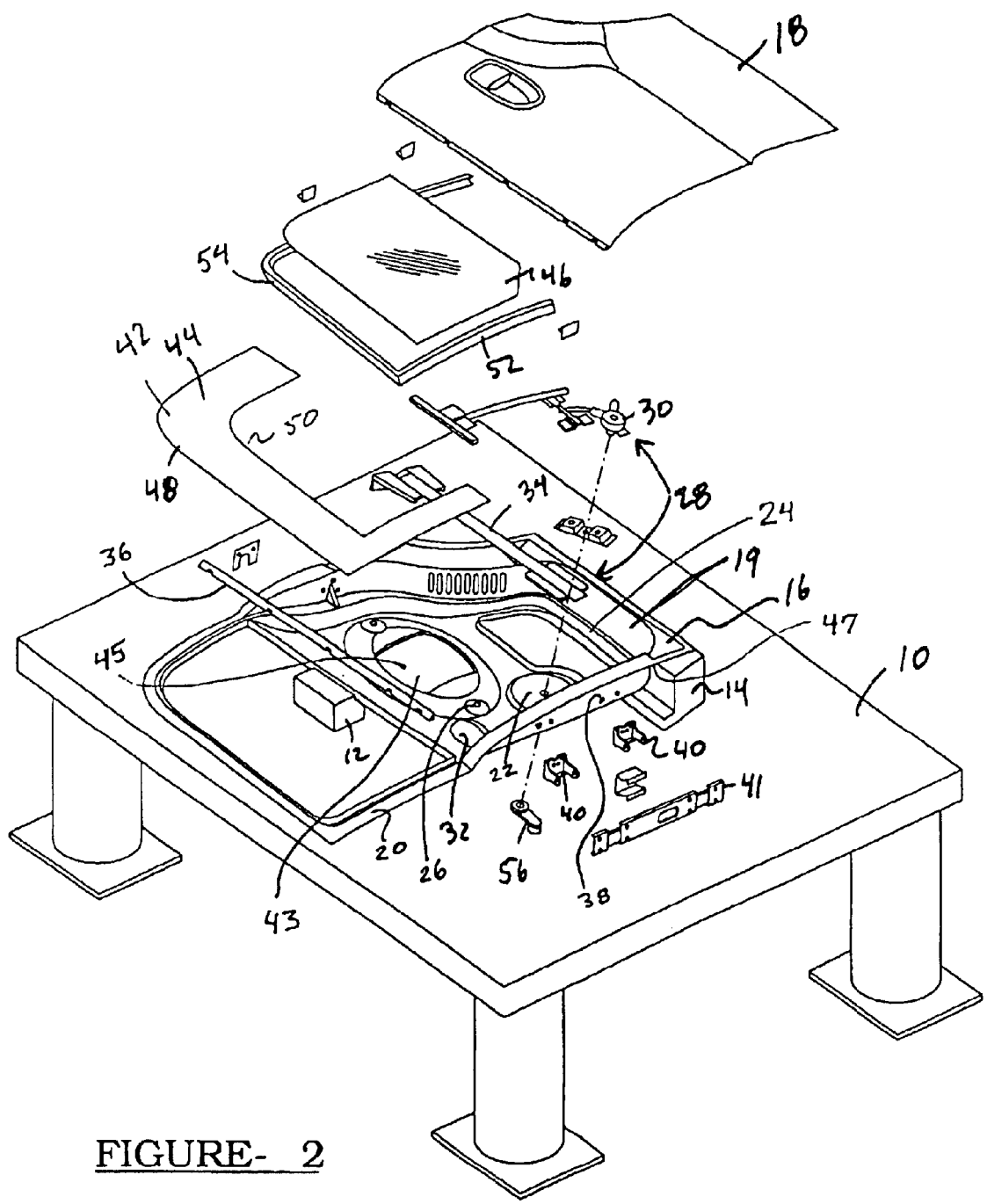

FIGS. 1 and 2 represent exploded perspective views of the assembly of front and rear doors according to the teachings of the present invention. Shown is a horizontal assembly fixture 10. Disposed upon assembly fixture jigs 12 and 14 is a vehicle door substructure 16 and mating exterior door panel 18. The door substructure 16 has a frame portion 19 and a window frame portion 20. Disposed within the frame portion 19 is the inner door component support structure 22, which is incorporated onto a frame interior surface 24. The component support structure 22 has a plurality of mounting points 26, which can take a form of threaded fasteners (either male or female) or apertures configured to accept snap fit components such as pine-tree fasteners.

The mounting points 26 are used to couple interior door components 28 to the door substructure 16. In this regard, the interior door components 28 can be, but are not limited to, a window lift mechanism 30, a lock assembly 32, a horizontal energy absorbing member 34, an exterior door panel coupling member 36, or inflatable safety restraint (not shown). Additionally, the frame portion 19 has exteriorly positioned apertures 38, which are used to couple a door hinges 40 and support brackets 41 to the door substructure 16.

It is envisioned that the vehicle door substructure 16 is formed either of stamped steel or is a reinforced polymer composite. As a polymer composite, the door substructure 16 can have either a reinforced thermoset or thermoformed matrix, reinforced with chopped or continuous fibers. The fibers can be formed of glass, carbon, or polyamide materials or mixtures thereof. Additionally, the vehicle door substrate can be formed of a reinforced polymer having a layer of gel coat, one layer of barrier coat and one layer of chopped fiber reinforcement. The use of a polymer door substructure 16 allows for the production of a door having a finished preformed interior trim surface. This design further allows for significant advantages with respect to inhibiting water and sound permeation into a vehicles passenger compartment. It however affords a disadvantage with respect to the repair of interior door components 28 within the door. As a result, prior to the mounting the interior door components 28 to the door substructure 16, repair access holes 43 should be incorporated into or defined in the inner door component support structure 22. These access holes should be covered by an interior trim panel 45 disposed on the inner surface 47 of the door substructure 16.

Additionally shown is the window 42 which is formed by first and second window sub-assemblies 44 and 46. The first window sub-assembly 44 is a component formed of glass or a transparent polymer material that is fixably mounted into the window frame portion 20. Additionally, the first window sub-assembly 44 is a generally U-shaped component having a generally convex surface 48 which conforms to the shape of the outside of the vehicle. The inside periphery 50 of the first window sub-assembly 44 is lined with an elastomeric seal 52, which is used to seal the exterior periphery 54 of the second window sub-assembly 46 to the first window sub-assembly 44.

In this regard, the second window sub-assembly 46 is generally planar, so that it can be used on either the left or right side of the vehicle. The second window sub-assembly 46 is slidably coupled to the door substructure 16 using window lift mechanisms 30. While the window lift mechanisms 30 is shown having a hand crank 56, those skilled in the art will recognize that it is possible to utilize an electronically controlled and driven lift mechanisms.

In having the door assembled on the fixture 10 as opposed to onto a door coupled to a vehicle, it is possible to quickly insert the interior door components 28 onto the component support structure 22. While it is envisioned that the interior door components 28 will be coupled to the door substructure 16 manually, the methods disclosed herein allow for a robotic insertion system to be used to insert and couple the interior door components 28 to the component support structure 22.

After the interior door components 28 have been fastened to the door substructure 16, the exterior door panel 18 is coupled the door substructure 16. The exterior door panel 18 can be coupled to the door substructure 16 utilizing standard threaded fasteners, snap-in fasteners or appropriate adhesives.

In this regard, the exterior door panel 18 is a finished component, which has a class-A finished surface. Because of this, the exterior door panel 18 does not need post assembly coating or surface treatments. It is preferred that the exterior door panel 18 be a reinforced polymer structure which is coated utilizing sprayed top and base coats, or in mold or vacuum applied thin film layers. The sprayed base coat can be a water based base coat or a solvent based base coat, while the sprayed top coat can be an alkyd finish, polyester finish, thermosetting acrylic finish, or thermoplastic acrylic finish.

Figure 3:
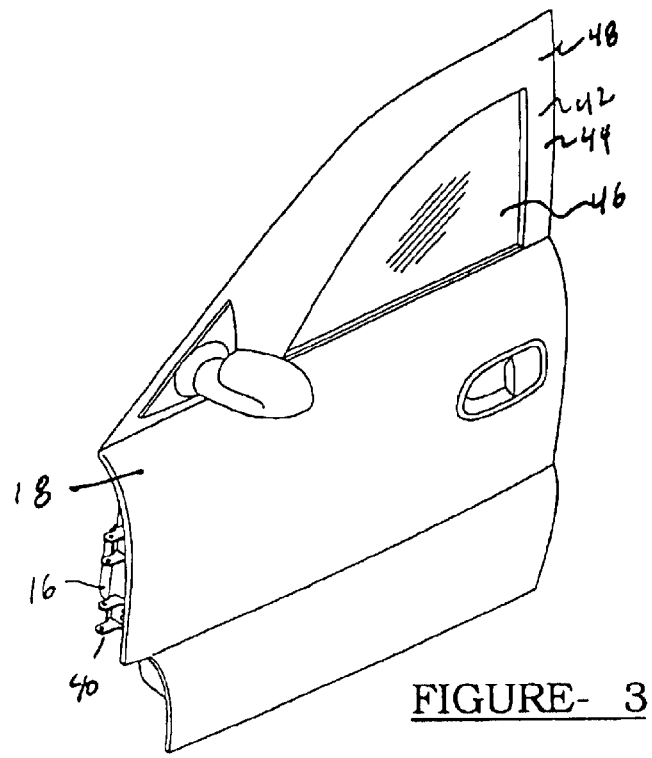
FIGS. 3 and 4 represent perspective views of front and rear doors manufactured according to the teachings of the present invention.
Figure 4:
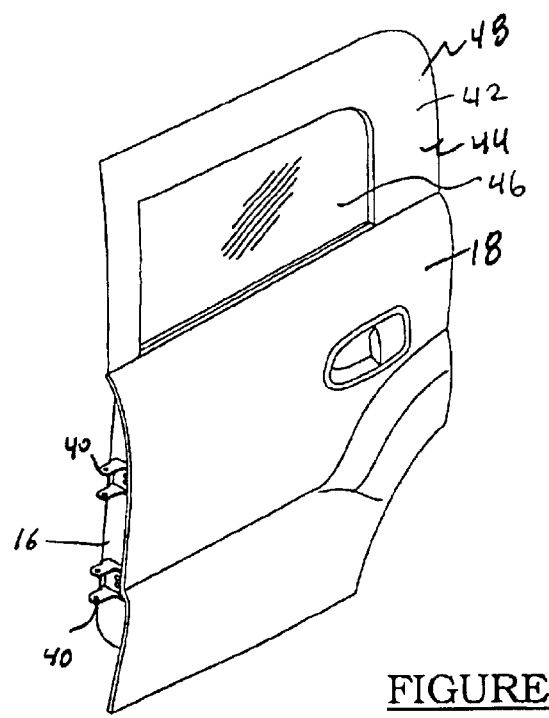

FIGS. 3 and 4 represent perspective views of front and rear doors manufactured according to the teachings of the present invention. Shown is the window 42 formed by first and second window sub-assemblies 44 and 46. The first window sub-assembly 44 is coupled to the door assembly along window frame portion 20. The second window sub-assembly 46 is shown disposed between the exterior door panel 18 and the door substructure 16.

Figure 5:
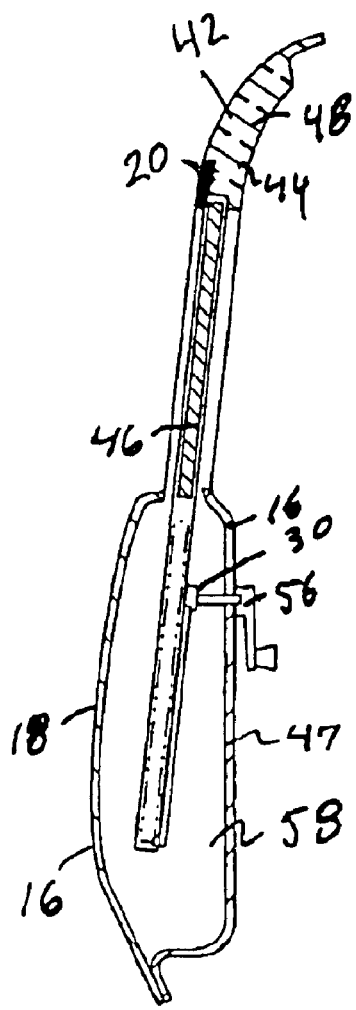
FIGS. 5 and 6 represent across sectional views of doors produced according to the teachings of the present invention.
Figure 6:
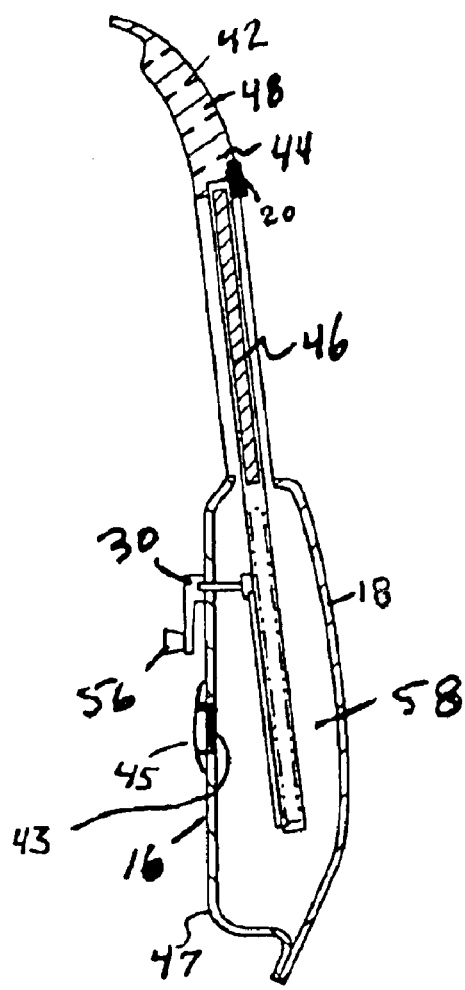

FIGS. 5 and 6 represent cross-sectional views of left and right doors produced according to the teachings of the present invention. Shown is the relationship of the exterior door panel 18 to the door substructure 16. As can be seen the exterior door panel 18 and the door substructure 16 define and interior cavity 58 which surround the interior door components 28.

The assembled vehicle door is produced by first coupling the door substructure 16 to the fixture jigs 12 and 14 of horizontal assembly fixture 10. Interior door components 28 are coupled to the inner door component support structure 22. These interior door components 28 can contain some or all of the components needed for the proper functioning of the door. The first window subassembly is coupled to the window frame portion 20 of the door substructure 16, while the second window subassembly 46 is disposed within the assembled door.

After the interior door components 28 are coupled to the inner door component support structure 22, the finished exterior door panel 18 is coupled to the door substructure 16 disposing the interior components between finished exterior door panel and a portion of the door substructure 16. The assembled door with a pre-finished exterior panel 18 is then coupled to the vehicle using the depending door hinges 40.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention.

What is claimed is:

1. A method for producing a vehicle door comprising the steps of:
   coupling a plurality of interior door components to a door substructure, the door substructure having an inner door component support structure defining a plurality of fasteners configured to receive the interior door components;
   adhesively bonding a finished exterior door panel having a class-A surface to the substructure to form a door, wherein the door interior components are disposed between the finished exterior door panel and a portion of the door substructure;
   coating the finished exterior door panel, prior to coupling the exterior door to the door substructure with at least one of a water based base coat or a solvent based base coat; and
   coupling the door to a vehicle after bonding the exterior door panel to the substructure.

2. The method according to claim 1 wherein one of the interior door components is a window lift mechanism.

3. The method according to claim 1 wherein one of the interior door components is a lock assembly.

4. The method according to claim 1 further comprising coupling at least one interior trim component to the door substructure.

5. The method according to claim 1 further comprising:
   coating the finished exterior door panel, prior to coupling the exterior door to the door substructure, with a top coat selected from the group consisting of an alkyd finish, a polyester finish, a thermosetting acrylic finish, and a thermoplastic acrylic finish.

6. The method according to claim 1 further comprising:
   forming the door substructure from stamped metal.

7. The method according to claim 1 wherein the door substructure comprises a reinforced polymer.

8. The method according to claim 7 wherein the reinforced polymer comprises one of a thermoset and a thermoplastic resin.

9. The method according to claim 7 wherein the reinforced polymer comprises at least one of a chopped fiber reinforcement, a continuous fiber reinforcement, or combinations thereof.

10. The method according to claim 7 wherein the reinforced polymer comprises one layer of a gel coat, one layer of a barrier coat and one layer of a chopped fiber reinforcement.

* * * * *